(12) United States Patent
Hao et al.

(10) Patent No.: US 10,578,919 B2
(45) Date of Patent: Mar. 3, 2020

(54) LIGHT GUIDE ASSEMBLY, FABRICATION METHOD THEREOF, BACKLIGHT MODULE AND DISPLAY DEVICE

(71) Applicants: BOE Technology Group Co., Ltd., Beijing (CN); Ordos Yuansheng Optoelectronics Co., Ltd., Ordos, Inner Mongolia (CN)

(72) Inventors: Ruijun Hao, Beijing (CN); Wulijibaier Tang, Beijing (CN); Long Lian, Beijing (CN); Zhongping Zhao, Beijing (CN); Yanling Feng, Beijing (CN); Haifeng Bi, Beijing (CN); Xintong Fan, Beijing (CN)

(73) Assignees: BOE Technology Group Co., Ltd., Beijing (CN); Ordos Yuansheng Optoelectronics Co., Ltd., Inner Mongolia (CN)

( * ) Notice: Subject to any disclaimer, the term of this patent is extended or adjusted under 35 U.S.C. 154(b) by 0 days.

(21) Appl. No.: 16/081,703

(22) PCT Filed: Jan. 22, 2018

(86) PCT No.: PCT/CN2018/073573
§ 371 (c)(1),
(2) Date: Aug. 31, 2018

(87) PCT Pub. No.: WO2018/196448
PCT Pub. Date: Nov. 1, 2018

(65) Prior Publication Data
US 2019/0391449 A1 Dec. 26, 2019

(30) Foreign Application Priority Data
Apr. 24, 2017 (CN) .......................... 2017 1 0271269

(51) Int. Cl.
*G02F 1/1335* (2006.01)
*F21V 8/00* (2006.01)

(52) U.S. Cl.
CPC ..... *G02F 1/133605* (2013.01); *G02B 6/0025* (2013.01); *G02B 6/0031* (2013.01);
(Continued)

(58) Field of Classification Search
CPC ......... G02F 1/133606; G02F 1/133605; G02F 1/133504; G02F 2001/133607;
(Continued)

(56) References Cited

U.S. PATENT DOCUMENTS 7,628,502 B2 * 12/2009 Kodama ........... G02F 1/133606
362/330
8,801,207 B2 * 8/2014 Meis .................... G02B 3/0006
362/97.1
(Continued)

FOREIGN PATENT DOCUMENTS

CN 101122704 2/2008
CN 101295036 10/2008
(Continued)

OTHER PUBLICATIONS

International Search Report and Written Opinion of the International Searching Authority for corresponding PCT Application No. PCT/CN2018/073573 (Foreign Text, 12 pages; English Translation, 5 pages) (dated Apr. 23, 2018).
(Continued)

Primary Examiner — Mariceli Santiago
(74) Attorney, Agent, or Firm — Myers Bigel, P.A.

(57) ABSTRACT

The present disclosure provides a light guide assembly, a fabrication method thereof, a backlight module, and a display device. The light guide assembly includes: a light guide plate having a light exit surface and a back surface opposite
(Continued)

to each other, and a side surface contacting the light exit surface and the back surface; a first reflective layer disposed on the light exit surface and having a plurality of light transmissive holes; a diffusion layer disposed on a side of the first reflective layer facing away from the light guide plate. The diffusion layer includes a plate and a plurality of protrusions disposed on the surface of the plate, the plurality of protrusions are in one-to-one correspondence with the plurality of the light transmissive holes, and each light transmissive hole receives a corresponding protrusion.

20 Claims, 5 Drawing Sheets

(52) U.S. Cl.
CPC ......... *G02B 6/0051* (2013.01); *G02B 6/0055* (2013.01); *G02B 6/0065* (2013.01); *G02F 1/133606* (2013.01); *G02F 1/133611* (2013.01); *G02B 6/0033* (2013.01); *G02B 6/0073* (2013.01); *G02F 1/133615* (2013.01)

(58) Field of Classification Search
CPC ..... G02F 2001/13356–133562; G02B 6/0025; G02B 6/0051; G02B 6/0055; G02B 6/0031; G02B 6/0033; G02B 6/0065
See application file for complete search history.

(56) References Cited

U.S. PATENT DOCUMENTS

| | | | | |
|---|---|---|---|---|
| 2006/0061869 A1* | 3/2006 | Fadel | ................... | G02B 3/0031 359/619 |
| 2006/0215075 A1 | 9/2006 | Huang et al. | | |
| 2007/0002453 A1* | 1/2007 | Munro | ............. | B29D 11/00278 359/627 |
| 2008/0037281 A1 | 2/2008 | Chang | | |
| 2008/0137005 A1* | 6/2008 | Kim | ...................... | G02B 6/0055 349/64 |
| 2008/0266875 A1 | 10/2008 | Chang et al. | | |
| 2008/0310184 A1 | 12/2008 | Katsumata | | |
| 2009/0168452 A1* | 7/2009 | Lee | ...................... | G02B 6/0053 362/608 |
| 2010/0254121 A1* | 10/2010 | Zhou | .................... | G02B 6/0043 362/147 |
| 2011/0058389 A1* | 3/2011 | Shiau | .................... | G02B 6/0053 362/607 |
| 2011/0128471 A1 | 6/2011 | Suckling et al. | | |
| 2013/0077345 A1 | 3/2013 | Sato et al. | | |
| 2014/0192285 A1 | 7/2014 | Shinkai et al. | | |
| 2015/0346551 A1 | 12/2015 | Sun et al. | | |
| 2016/0327724 A1 | 11/2016 | Wu et al. | | |
| 2018/0299610 A1* | 10/2018 | Saito | ......................... | G02B 5/20 |

FOREIGN PATENT DOCUMENTS

| | | | |
|---|---|---|---|
| CN | 101435881 A | * | 5/2009 |
| CN | 201281770 | | 7/2009 |
| CN | 101846764 | | 9/2010 |
| CN | 102042565 A | * | 5/2011 |
| CN | 202177719 | | 3/2012 |
| CN | 102933894 | | 2/2013 |
| CN | 103703301 | | 4/2014 |
| CN | 103712128 | | 4/2014 |
| CN | 104298003 | | 1/2015 |
| CN | 106873072 | | 6/2017 |
| JP | 2004061874 | | 2/2004 |
| JP | 2012174372 | | 9/2012 |

OTHER PUBLICATIONS

Chinese Office Action corresponding to Chinese Patent Application No. 201710271269.7 (Foreign Text, 6 pages; English Translation, 1 page) (dated Dec. 3, 2018).

* cited by examiner

LIGHT GUIDE ASSEMBLY, FABRICATION METHOD THEREOF, BACKLIGHT MODULE AND DISPLAY DEVICE

RELATED APPLICATIONS

The present application is a 35 U.S.C. 371 national stage application of PCT International Application No. PCT/CN2018/073573, filed on Jan. 22, 2018, which claims the benefit of Chinese patent application No. 201710271269.7, filed on Apr. 24, 2017, the contents of which are incorporated herein by reference in their entireties.

TECHNICAL FIELD

The present disclosure relates to the field of display technology, in particular to a light guide assembly, a fabrication method thereof, a backlight module and a display device.

BACKGROUND

At present, the development of display screens tends to be narrow frame, ultra-thin, and high brightness, and the conventional backlights can't meet high grade requirements. The conventional backlight is composed of LED, multilayer films, light guide assembly, housing frame and light-shielding tape, when it is applied to meet the high grade requirements, it will cause various defects such as bright lines, light leakage, wrinkles, and glue failure, which will greatly reduce the yield of products and increase costs. Moreover, the ultra-thin, narrow frame display screen requires extremely high accuracy for cutting and assembly of the film, and the requirement for uniformity of the light output is gradually increased. Therefore, the current backlight still needs improvement.

SUMMARY

In an aspect of the disclosure, the present disclosure provides a light guide assembly. According to an embodiment of the present disclosure, the light guide assembly includes: a light guide plate having a light exit surface and a back surface opposite to each other, and a side surface contacting the light exit surface and the back surface; a first reflective layer disposed on the light exit surface and having a plurality of light transmissive holes; a diffusion layer disposed on a side of the first reflective layer facing away from the light guide plate. The diffusion layer includes a plate and a plurality of protrusions disposed on the surface of the plate, the plurality of protrusions are in one-to-one correspondence with the plurality of the light transmissive holes, and each light transmissive hole receives a corresponding protrusion.

According to an embodiment of the present disclosure, the light guide assembly further includes a second reflective layer disposed on a part of the side surface and the back surface.

According to an embodiment of the present disclosure, the first reflective layer, the diffusion layer, and the second reflective layer are formed by a coating, printing, spraying, or plating process.

According to an embodiment of the present disclosure, the diffusion layer is integral.

According to an embodiment of the present disclosure, the back surface has a plurality of microstructures.

According to an embodiment of the present disclosure, a part of the side surface is used as a light entrance surface; along a direction departing from the light entrance surface, a sum of areas of the light transmissive holes per unit area on the first reflective layer decreases gradually.

According to an embodiment of the present disclosure, areas of the plurality of light transmissive holes are equal; a part of the side surface is used as a light entrance surface; and along a direction departing from the light entrance surface, a distance between two adjacent light transmissive holes decreases gradually.

According to an embodiment of the present disclosure, a distance between two adjacent light transmissive holes is constant; a part of the side face is used as a light entrance surface; and along a direction departing from the light entrance surface, an area of the light transmissive holes increases gradually.

According to an embodiment of the present disclosure, the light guide plate further includes a light entrance surface; and the light entrance surface is provided with a light source receiving groove.

In another aspect of the disclosure, the present disclosure provides a backlight module. According to an embodiment of the present disclosure, the backlight module includes: the light guide assembly described in the above embodiments; and a light source disposed on a light entrance surface of the light guide plate. Those skilled in the art can understand that the backlight module has all the features and advantages of the light guide assembly described above, which will not be described in detail herein.

According to an embodiment of the present disclosure, the light source is an LED light source.

According to an embodiment of the present disclosure, the LED light source includes: an LED flexible circuit board; and an LED light strip disposed on a surface of the LED flexible circuit board. The light entrance surface is provided with a light source receiving groove, and the LED light strip is disposed in the light source receiving groove.

According to an embodiment of the present disclosure, a light emitting surface of the LED light strip is parallel to a surface of the LED flexible circuit board.

In yet another aspect of the present disclosure, the present disclosure provides a display device. According to an embodiment of the present disclosure, the display device includes the backlight module described in the above embodiments. Those skilled in the art can understand that the display device has all the features and advantages of the light guide assembly and the backlight module described above, which will not be described in detail herein.

In still another aspect of the present disclosure, the present disclosure provides a method for fabricating a light guide assembly. According to an embodiment of the present disclosure, the method includes: providing a light guide plate having a light exit surface and a back surface opposite to each other, and a side surface contacting the light exit surface and the back surface; a part of the side surface being used as a light entrance surface; forming a first reflective layer on the light exit surface, the first reflective layer having a plurality of light transmissive holes; and forming a diffusion layer on a side of the first reflective layer facing away from the light guide plate, the diffusion layer including a plate and a plurality of protrusions disposed on a surface of the plate, the plurality of protrusions being in one-to-one correspondence with the plurality of the light transmissive holes, and each light transmissive hole receiving a corresponding protrusion.

According to an embodiment of the present disclosure, the first reflective layer and the diffusion layer are formed by a coating, printing, spraying, or plating process.

According to an embodiment of the present disclosure, the method further includes forming a second reflective layer on a part of the side surface and the back surface, the second reflective layer being formed by a coating, printing, spraying, or plating process. According to an embodiment of the present disclosure, at least a part of the side surface is subjected to a matting treatment before forming the second reflective layer.

According to an embodiment of the present disclosure, the light exit surface is subjected to a cutting treatment or a surface grinding treatment before forming the first reflective layer.

According to an embodiment of the present disclosure, forming the first reflective layer on the light exit surface further includes: forming a mask on the light exit surface, the pattern of the mask corresponding to the pattern of the light transmissive holes; forming the first reflective layer by a coating, printing, spraying or plating process; and removing the mask.

DETAILED DESCRIPTION OF THE DISCLOSURE

The embodiments of the present disclosure are described in detail below. The embodiments described below are exemplary. The embodiments are used to explain the present disclosure only, and should not be construed as limiting the present disclosure. For specific techniques or conditions that are not indicated in the embodiments, they are performed according to the techniques or conditions described in the literature in the field or according to the product specifications. The reagents or instruments used without indicating the manufacturers are all conventional products that can be purchased on the market.

At present, the conventional backlight is composed of LED, multilayer films, light guide assembly, housing frame and light-shielding tape. When the conventional backlight is applied to a narrow frame, ultra-thin, high-brightness display screen, it will cause various defects such as bright lines, light leakage, wrinkles, and glue failure. In addition, the assembly and processing of the multilayer optical films may cause problems such as assembly misalignment, scratches, and foreign bodies.

Figure 1:
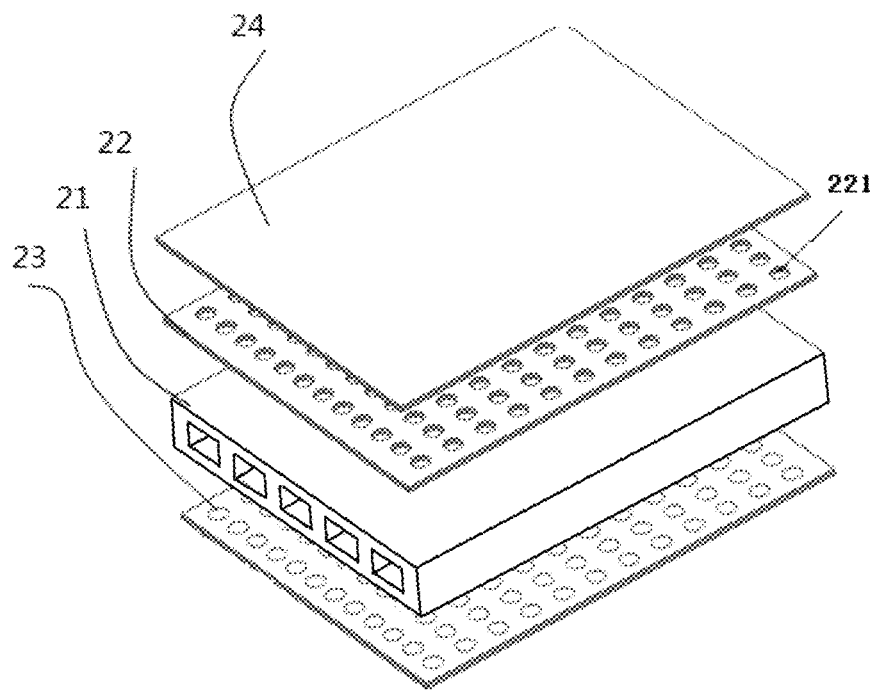
FIG. 1 shows an exploded view of a light guide assembly according to an embodiment of the present disclosure.
Figure 2:
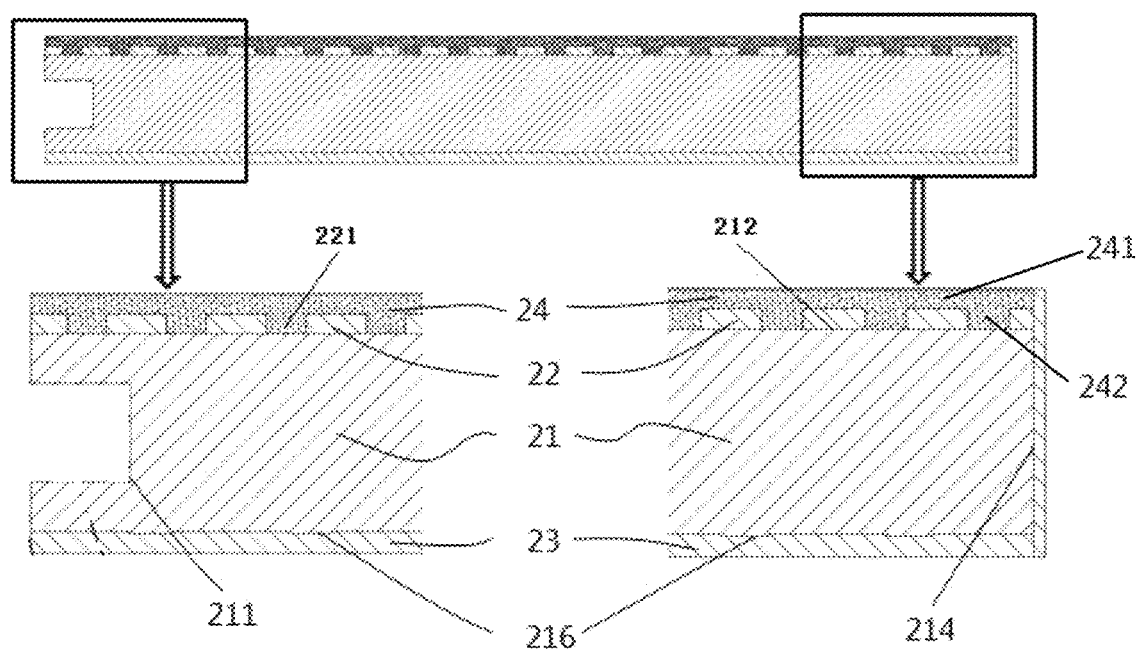
FIG. 2 shows a structural schematic diagram of a cross section of a light guide assembly according to an embodiment of the present disclosure.

In one aspect of the disclosure, the present disclosure provides a light guide assembly. According to an embodiment of the present disclosure, referring to FIG. 1 to FIG. 3, the light guide assembly includes: a light guide plate 21 having a light exit surface 212 and a back surface 216 opposite to each other, and a side surface 210 contacting the light exit surface 212 and the back surface 216; a first reflective layer 22 disposed on the light exit surface 212 and having a plurality of light transmissive holes 221. A diffusion layer 24 is disposed on a side of the first reflective layer 22 facing away from the light guide plate 21, and the diffusion layer 24 includes a plate 241 and a plurality of protrusions 242 disposed on a surface of the plate 241, the plurality of protrusions 242 are in one-to-one correspondence with the plurality of the light transmissive holes 221, and each light transmissive hole 221 receives a corresponding protrusion 242.

Figure 3:
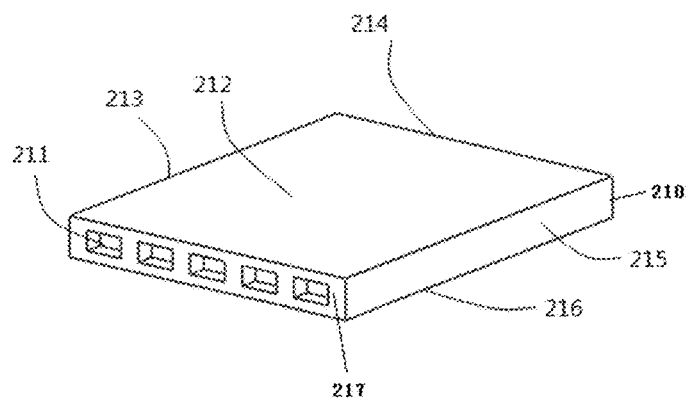
FIG. 3 shows a structural schematic diagram of a light guide plate according to an embodiment of the present disclosure.

Specifically, referring to FIG. 3, the side surface 210 of the light guide plate includes four parts, i.e., a first side surface 213, a second side surface 214, a third side surface 215, and a fourth side surface 217. Each part of the side surface can be used, for example, as a light entrance surface.

The reflective layer and the diffusion layer in the light guide assembly can be formed by coating, plating, etc., which reduces the cumbersome processing and assembly procedure of films in the prior art, and avoids defects during the processing and assembly procedure such as dimensional instability, foreign bodies, scratches, assembly misalignment, etc., thereby reducing production costs significantly, and improving production efficiency and yield. Moreover, it can also meet the requirements of narrow frame and ultra-thinness of the practical module. In addition, the brightness uniformity of the light guide assembly can be achieved by adjusting the arrangement of the light transmissive holes of the first reflective layer, thereby avoiding modifying the light guide plate mold, reducing the cost and cycle for mold modifying, improving the versatility of the light guide plate mold and the light guide plate processed by the mold, and extending the service life as well. Correspondingly, a part of the diffusion layer (i.e., the plurality of protrusions) is arranged in the light transmissive hole of the reflective layer by process such as coating, and plating, so that the light emitted from the light exit surface of the light guide plate can be more uniform, improving optical effects.

According to an embodiment of the present disclosure, the light guide assembly can further include a second reflective layer 23 disposed on a part of the side surface 210 and the back surface 216. Thus, the light refracted from the light guide plate can be reflected to the light exit direction for reuse, thereby improving the light utilization efficiency significantly.

It should be noted that the description used in the present disclosure, "a part of the diffusion layer is arranged in the light transmissive holes" should be understood in a broad sense. That is, the diffusion layer can be arranged in a part of the transmissive holes or the diffusion layer can be arranged in all the light transmissive holes.

According to an embodiment of the present disclosure, the specific material for forming the light guide plate is not particularly limited, and materials of conventional light guide plates in the art may be employed, such as but not limited to polymethyl methacrylate, polycarbonate, etc., thereby having improved light transmissive and mechanical properties.

According to an embodiment of the present disclosure, the diffusion layer 24 is integral. In the context of the present disclosure, "the diffusion layer is integral" means that the plate 241 and the plurality of protrusions 242 are integrally formed.

According to an embodiment of the present disclosure, in order to further improve light utilization, the back surface of the light guide plate may be provided with a plurality of microstructures. When light hits the microstructures, the condition of total internal reflection is destroyed, the reflected light will diffuse at various angles, then exit from the front side of the light guide plate. By disposing various kinds of microstructures with different densities and sizes, the light guide plate can emit light uniformly. In the embodiment of the present disclosure, the size, shape, distribution manner of the microstructures are not particularly limited, and may be selected according to actual requirements. Specifically, it is desired to improve the uniformity of the light exit from the light guide plate.

According to an embodiment of the present disclosure, in order to further improve the light uniformity and the performance of the light guide plate, at least a part of the side surface of the light guide plate may be subjected to a matting treatment in advance. Thus, the surface roughness can be effectively increased, so that when the light hits the side surface, the reflected light diffuses to the periphery, thereby avoiding the generation of the edge bright lines. Referring to FIG. 3, the first side surface 213, the second side surface 214, and the third side surface 215 may be subjected to a matting treatment in advance, thereby avoiding edge bright lines.

According to an embodiment of the present disclosure, in order to further improve the performance of the light guide plate, the light exit surface of the light guide plate may be subjected to a cutting treatment or a surface matting treatment in advance. Thus, the light uniformity can be further improved.

Figure 12:
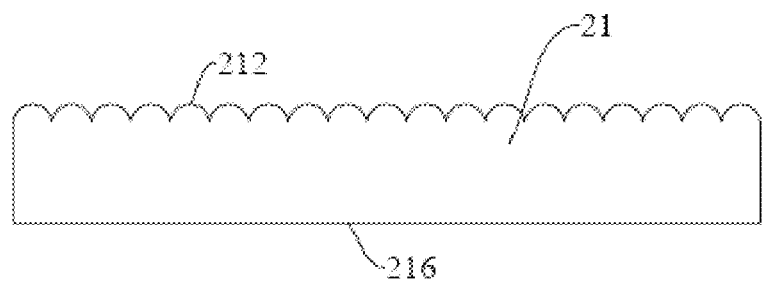
FIG. 12 shows a structural schematic diagram of a cross section of a light guide plate according to an embodiment of the present disclosure.

It should be noted that the description "cutting treatment" used herein refers to forming an arc-shaped prism structure (i.e., an R-CUT structure, see FIG. 12 for a specific structure) by cutting the light exit surface of the light guide plate.

According to an embodiment of the present disclosure, referring to FIG. 3, in order to cooperate with the light source and improve the light utilization efficiency, the light entrance surface (i.e., the fourth side surface 217) of the light guide plate may further be provided with a light source receiving groove 211. Therefore, the light source can be disposed in the light source receiving groove 211, which can ensure that more of the light emitted by the light source enters the light guide plate, thereby improving the light utilization efficiency and achieving high brightness.

According to the embodiments of the present disclosure, the first reflective layer, the diffusion layer, and the second reflective layer are formed by a coating, printing, spraying, or plating process. In this way, the process is mature, the steps are simple, the operation is convenient, the large scale production is easy to be realized, and the complicated operation steps such as processing and assembly of the multilayer films in the prior art are overcome, and manpower and material resources are saved, and the cost is low. Moreover, with the first reflective layer, the diffusion layer and the second reflective layer used in the light guide assembly, unqualified film cutting, edge burrs, scratches, and defects in assembly procedure such as misalignment, foreign bodies, dirt, etc. can be avoided, so that the light guide assembly can be applied to a high grade display panel with a narrow frame, ultra-thinness, high brightness, etc., to meet high requirements.

According to the embodiments of the present disclosure, the material forming the first reflective layer and the second reflective layer is not particularly limited as long as the requirement for reflection performance is satisfied. In some embodiments of the present disclosure, the materials forming the first reflective layer and the second reflective layer include, but are not limited to, metals such as silver, aluminum, and the like. Thus, the first reflective layer and the second reflective layer have a high reflectance and high light utilization efficiency.

According to the embodiments of the present disclosure, the material forming the diffusion layer is also not particularly limited as long as it has an effect of diffusing light. In some embodiments of the present disclosure, the diffusion layer may be formed by a matrix material and diffusion particles dispersed in the matrix material. The matrix material may be a polymer, and the diffusion particles may be inorganic oxide particles or the like as long as they have a suitable refractive index so that the formed diffusion layer has a desired diffusion effect, and the specific material can be flexibly selected by those skilled in the art according to actual requirements.

According to the embodiments of the present disclosure, the first reflective layer is provided with light transmissive holes. It is thus ensured that the light is transmitted through the first reflective layer effectively, and the uniformity of the light exit from the light guide plate can be controlled by adjusting the distribution of the light transmissive holes. According to the embodiments of the present disclosure, the shape and distribution manner of the light transmissive holes are not particularly limited as long as the requirements are satisfied, and those skilled in the art can flexibly select according to actual requirements. In some embodiments of the present disclosure, the shape of the light transmissive holes may include, but is not limited to, a circle, a rectangle, a square, and other regular or irregular shapes.

In some embodiments of the present disclosure, a part of the side surface is used as a light entrance surface; along a direction departing from the light entrance surface, a sum of areas of the light transmissive holes per unit area on the first reflective layer decreases gradually.

Optionally, in some specific embodiments of the present disclosure, areas of the plurality of light transmissive holes are equal; a part of the side surface is used as a light entrance surface; and along a direction departing from the light entrance surface, a distance between two adjacent light transmissive holes decreases gradually.

Alternatively, in some specific embodiments of the present disclosure, a distance between two adjacent light transmissive holes is constant; a part of the side face is used as a light entrance surface; and along a direction departing from the light entrance surface, an area of the light transmissive holes increases gradually.

Figure 4:
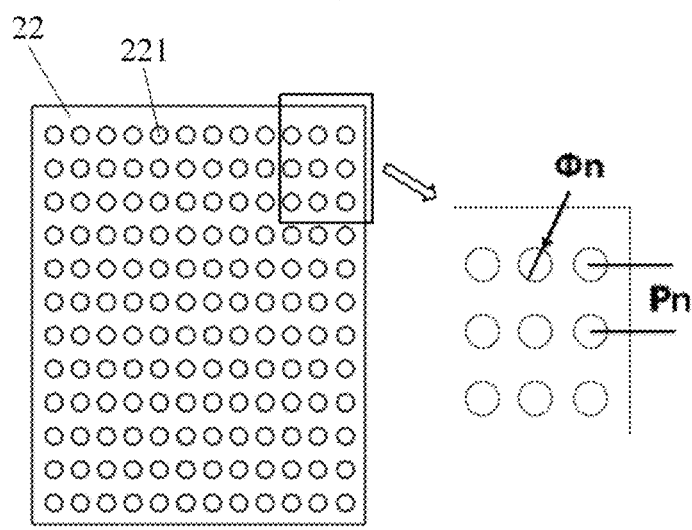
FIG. 4 shows a planar structural schematic diagram of a first reflective layer according to an embodiment of the present disclosure.

As an example, when the light transmissive hole is circular, referring to FIG. 4, along a direction departing from the light entrance surface, the plurality of light transmissive holes are distributed in at least one of the following manners: a diameter φn of the light transmissive hole is constant, and the distance Pn between two adjacent light transmissive holes decreases gradually; a distance Pn between two adjacent light transmissive holes is constant, and a diameter φn of the light transmissive holes increases gradually. In this way, the uniformity of the light exit from the light guide assembly can be improved.

In another aspect of the disclosure, the present disclosure provides a backlight module. According to an embodiment of the present disclosure, referring to FIG. 5 and FIG. 6, the backlight module includes the light guide assembly 20 described in the above embodiments and a light source 10 disposed on a light entrance surface of the light guide plate.

The backlight module is composed of LED and light guide plate without applying the housing frame and the light-shielding tape, and adopts coating or plating process on the surface of the light guide plate instead, and realizes the frameless design, which can satisfy ultra-thin and narrow frame requirements for a display module. The backlight module omits the multilayer optical films, housing frame and various tapes, which saves cost of raw material and cost of processing and assembly, improves product competitiveness, avoids many raw materials defects such as unqualified film cutting, edge burrs, scratches, and eliminates defects during assembly procedure such as misalignment, foreign bodies, dirt, etc., thereby improving the product yield significantly. Moreover, the structure of the backlight module is simple. Compared with the complex structure of the conventional multilayer films, the reliability of the product is improved. In the reliability test, many defects such as water ingress, wrinkles, Newton's rings are avoided, and the product can be more easily certified by the customer.

According to the embodiments of the present disclosure, the specific kind of the light source that can be employed is not particularly limited and can be any light source commonly used in the art. In some embodiments of the present disclosure, the light source that can be employed is an LED light source. Thus, the light source has high brightness and low energy consumption, and is environmentally friendly.

Figure 5:
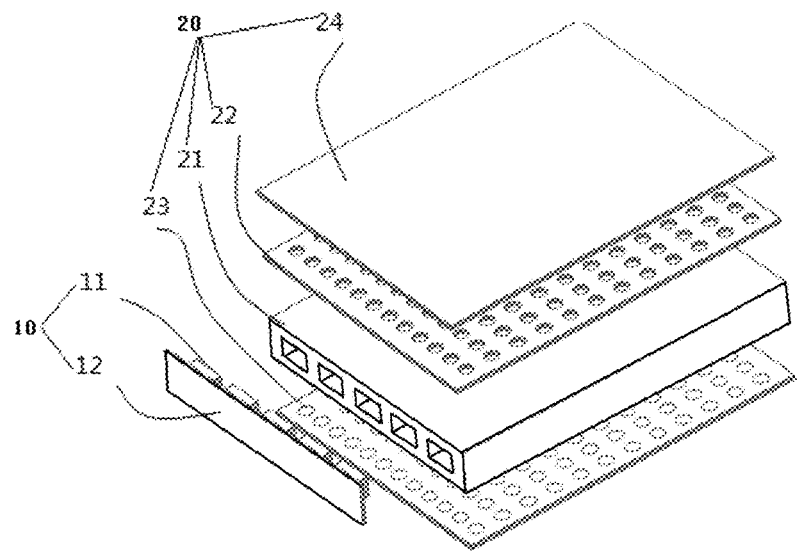
FIG. 5 shows an exploded view of a backlight module according to an embodiment of the present disclosure.
Figure 6:
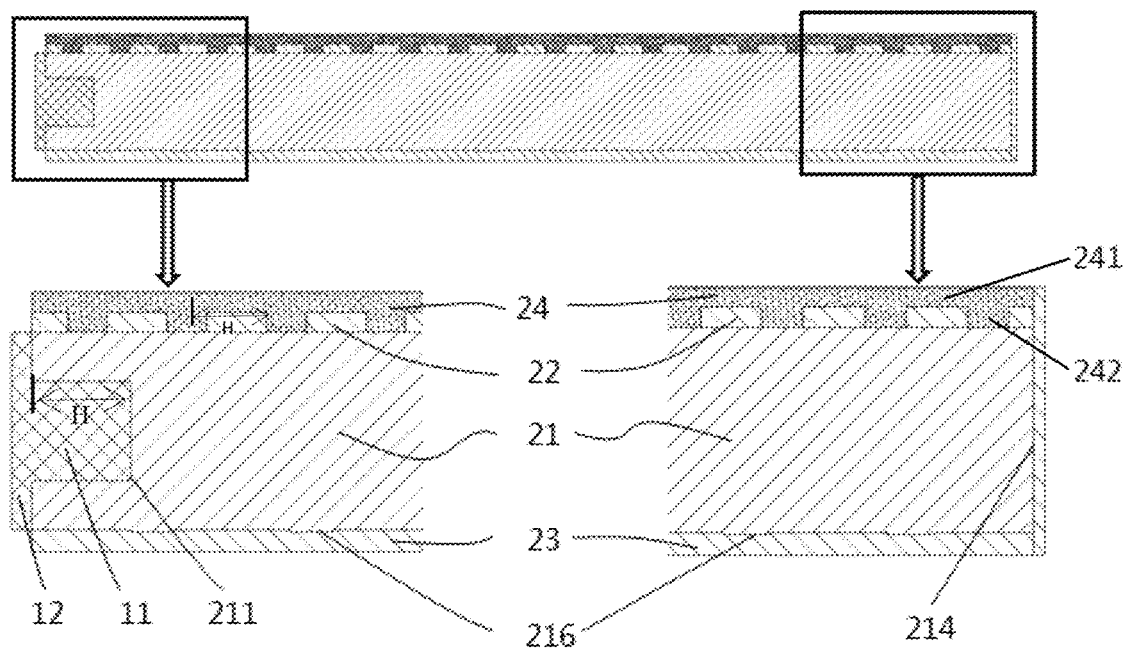
FIG. 6 shows a structural schematic diagram of a cross section of a backlight module according to an embodiment of the present disclosure.

According to an embodiment of the present disclosure, referring to FIG. 5 and FIG. 6, the LED light source may include: an LED flexible circuit board 12; and an LED light strip 11 disposed on a surface of the LED flexible circuit board 12. The light entrance surface of the light guide plate is provided with a light source receiving groove 211, and the LED light strip 11 is disposed is disposed in the light source receiving groove 211. Therefore, the LED flexible circuit board 12 can connect the LED light strip 11 to other components such as a power source while supporting the LED light strip 11.

Figure 7A:
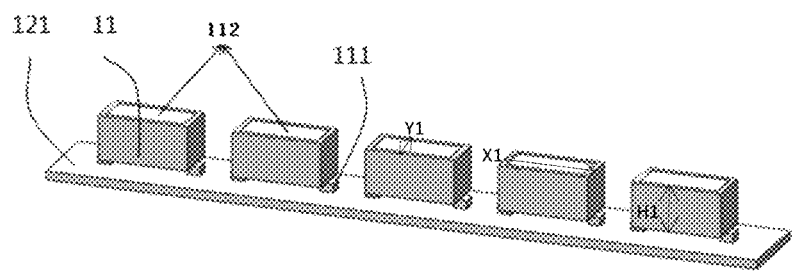
FIG. 7A shows a structural schematic diagram of an LED light source according to an embodiment of the present disclosure.
Figure 7B:
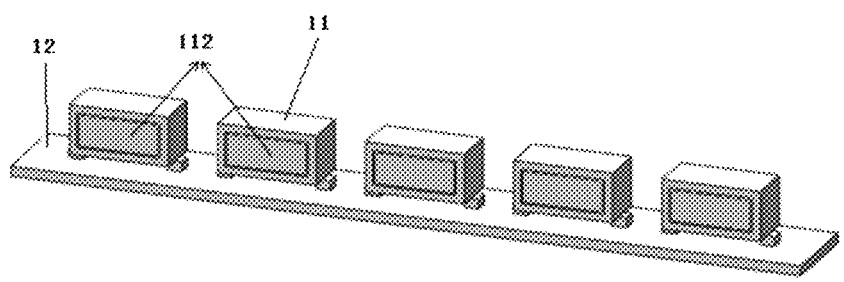
FIG. 7B shows a structural schematic diagram of a LED light source in the prior art.

According to an embodiment of the present disclosure, a light emitting surface 112 of the LED light strip 11 is parallel to a surface of the LED flexible circuit board 12 (see FIG. 7A for a structural schematic diagram). Compared with the existing LED light source in which a light emitting surface 112 of the LED light strip 11 is disposed perpendicular to the LED flexible circuit board 12 (see FIG. 7B for a structural schematic diagram), the arrangement of the present disclosure can ensure that more of the light emitted by the LED light strip enters the light guide plate, thereby improving the light utilization efficiency effectively.

Figure 8:
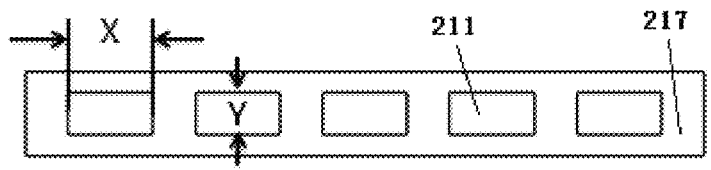
FIG. 8 shows a planar structural schematic diagram of a fourth side surface 217 of a light guide plate according to an embodiment of the present disclosure.

According to an embodiment of the present disclosure, the specific size of the LED light strip that can be employed is not particularly limited as long as it can be accommodated in the light source receiving groove. In some embodiments of the present disclosure, referring to FIG. 6, FIG. 7A and FIG. 8, a length X1 and a width Y1 of the LED strip are respectively smaller than a length X and a width Y of the light source receiving groove, thereby facilitating assembly and rework of the LED light strip. In some embodiments of the present disclosure, a thickness H1 of the LED light strip is the same as a depth H of the light source receiving groove, which can ensure that the optical coupling distance between the LED and the light guide plate is zero, ensuring maximum light utilization efficiency.

According to an embodiment of the present disclosure, in order to further improve light utilization efficiency, a third reflective layer is disposed on a side of the LED flexible circuit board facing the light guide assembly. Referring to FIG. 7A, the third reflective layer is disposed on the surface 121 of the LED flexible circuit board. Therefore, the third reflective layer can reflect the light hitting the LED flexible circuit board to the light guide plate, thereby improving the brightness and preventing light leakage.

According to the embodiment of the present disclosure, the material of the third reflective layer is not particularly limited, which can be flexibly selected by those skilled in the art according to actual requirements. In a specific example of the present disclosure, the surface 121 of the LED flexible circuit board is attached with a double-sided tape, a white or silver surface of the tape is bonded to the light guide plate, and a black surface of the tape is bonded to the LED flexible circuit board. The tape can effectively reflect light to the light guide plate while fixing the LED flexible circuit board, thereby improving the brightness and preventing light leakage. In another specific example of the present disclosure, a third reflective layer can also be formed by coating or plating on the surface 121 of the LED flexible circuit board, then the surface 121 of the LED flexible circuit board can be bonded to the light guide plate by a solid glue or a liquid glue. It is also possible to achieve the purpose of improving the brightness and preventing light leakage, as well as fixing the LED flexible circuit board.

According to an embodiment of the present disclosure, in order to further improve the performance of the backlight module, it can further include other film layers such as a prism film, thereby maximizing the brightness of the light exit from the light exit surface and further improving the performance of the backlight module.

In yet another aspect of the present disclosure, the present disclosure provides a display device. According to an embodiment of the present disclosure, the display device includes the backlight module described in the above embodiments. Those skilled in the art can understand that the display device has all the features and advantages of the light guide assembly and the backlight module described above, which will not be described in detail herein.

According to the embodiments of the present disclosure, the specific type of the display device is not particularly limited, and can be any device with a display function, such as but not limited to a display panel, a mobile phone, a tablet computer, a computer display, a television, a game console, a wearable device, and various household and living appliances with display functions.

It will be understood by those skilled in the art that in addition to the backlight module described above, the display device further includes necessary structures and components for a conventional display device. Taking a display panel as an example, in addition to the backlight module described above, the display panel also includes a liquid crystal display module or an organic electroluminescence display module, which will not be described in detail herein.

Figure 9:
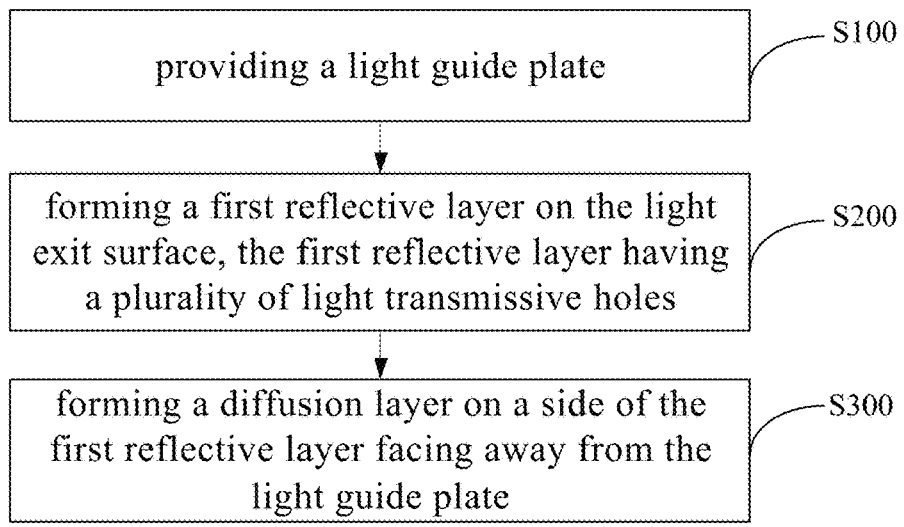
FIG. 9 shows a flow chart of a method for fabricating a light guide assembly according to an embodiment of the present disclosure.

In still another aspect of the present disclosure, the present disclosure provides a method for fabricating a light guide assembly. According to an embodiment of the present disclosure, referring to FIG. 9, the method includes the following steps.

S100: providing a light guide plate having a light exit surface and a back surface opposite to each other, and a side surface contacting the light exit surface and the back surface.

According to an embodiment of the present disclosure, the light guide plate provided in this step is not particularly limited, and can be any light guide plate commonly used in the art. The material of the light guide plate and the specific structure of the light guide plate may be the same as the light guide plate described in the above light guide assembly, which will not be described in detail herein.

S200: forming a first reflective layer on the light exit surface, the first reflective layer having a plurality of light transmissive holes.

According to an embodiment of the present disclosure, the light exit surface may be subjected to a cutting treatment or a surface grinding treatment before forming the first reflective layer. Thus, it is advantageous to improve the uniformity of the light exit from the light guide assembly.

According to an embodiment of the present disclosure, in this step, the first reflective layer can be formed by a coating, printing, spraying, or plating process. Therefore, the operation is simple, convenient, and easy to control, and there is no special requirement for equipment and technicians, and it is easy to realize large scale production. Moreover, the first reflective layer formed by the above method can avoid defects such as unqualified cutting, edge burrs, scratches, etc. in the subsequent cutting procedure and improve the product yield of the light guide assembly significantly.

Figure 11:
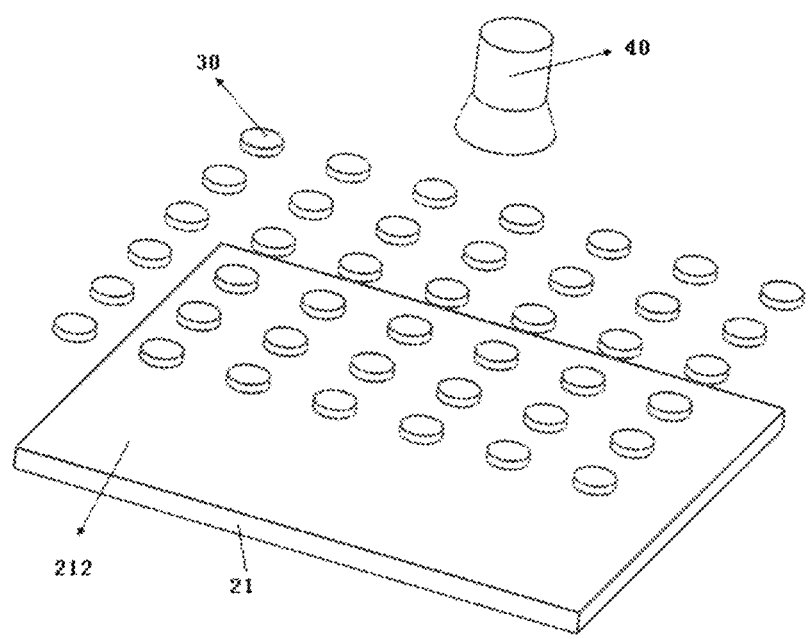
FIG. 11 shows a schematic diagram of forming a first reflective layer according to an embodiment of the present disclosure.

According to an embodiment of the present disclosure, specific steps of forming the first reflective layer can be flexibly selected by a person skilled in the art according to requirements. For example, an entire reflective layer covering the light exit surface can be formed by a coating, printing, spraying or plating process first, then the entire reflective layer are patterned, for example, to form a pattern of light transmissive holes by a patterning process. Alternatively, a mask corresponding to the pattern of light transmissive holes can be formed on the light exit surface first, then a first reflective layer is formed by coating, printing, spraying, or plating process, then the mask is removed. According to a specific example of the present disclosure, the first reflective layer is formed by spraying. Referring to FIG. 11, the step of forming the first reflective layer may include: forming a mask 30 on the light exit surface 212 of the light guide plate, the mask 30 having a pattern corresponding to the light transmissive holes; forming a first reflective layer with light transmissive holes by a spraying device; and removing the mask.

S300: forming a diffusion layer on a side of the first reflective layer facing away from the light guide plate; the diffusion layer including a plate and a plurality of protrusions disposed on a surface of the plate, the plurality of protrusions being in one-to-one correspondence with the plurality of the light transmissive holes, and each light transmissive hole receiving a corresponding protrusion.

According to an embodiment of the present disclosure, in this step, the diffusion layer may be formed by a coating, printing, spraying, or plating process. In some embodiments of the present disclosure, the materials forming the diffusion layer may be mixed to obtain a paste, then the diffusion layer is formed on a side of the first reflective layer facing away from the light guide plate by a coating process.

Figure 10:
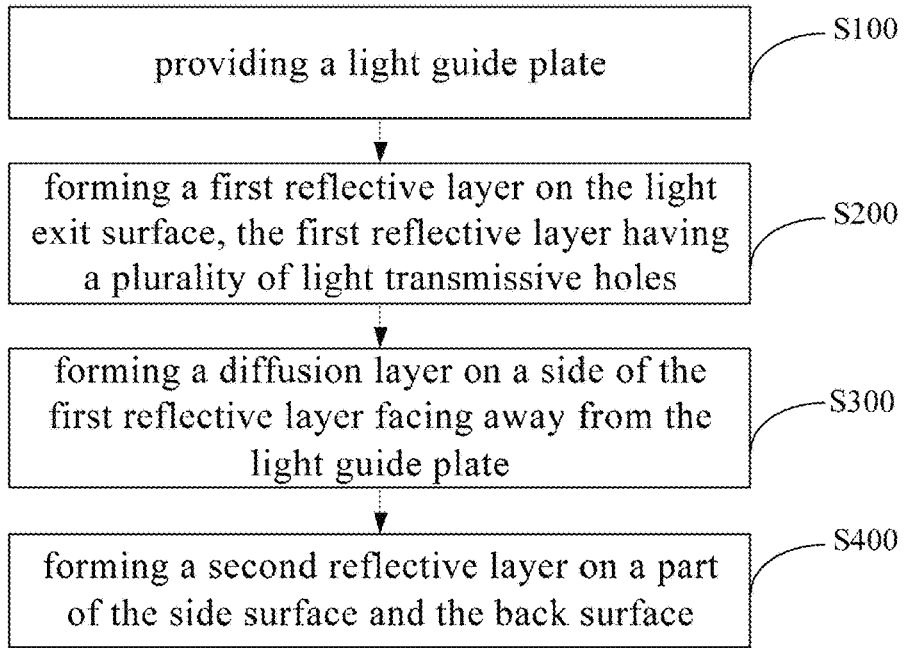
FIG. 10 shows a flow chart of a method for fabricating a light guide assembly according to another embodiment of the present disclosure.

According to an embodiment of the present disclosure, referring to FIG. 10, the method may further include the following step.

S400: forming a second reflective layer on a part of the side surface and the back surface.

According to an embodiment of the present disclosure, the side surface is subjected to a matting treatment before forming the second reflective layer. In this way, the roughness can be increased, so that most of the light incident to the surface is scattered rather than reflected directly, thereby avoiding the generation of the edge bright lines.

According to the embodiments of the present disclosure, the method of fabricating a light guide assembly can be effectively used for fabricating the light guide assembly described above. The light guide plate, the first reflective layer, the second reflective layer, and the diffusion layer are all in consistent with the description above, which will not be described in detail herein.

The method avoids the cumbersome processing and assembly procedure of films in the prior art, greatly improves the production yield and production efficiency, and it is easy to realize large scale production. In addition, the method reduces the cumbersome processing and assembly procedure of films in the prior art, and avoids defects during the processing and assembly procedure such as dimensional instability, foreign bodies, scratches, assembly misalignment, etc., thereby reducing production costs significantly, and improving production efficiency and yield. Moreover, the brightness uniformity of the light guide assembly can be achieved by adjusting the arrangement of the light transmissive holes of the first reflective layer, thereby avoiding modifying the light guide plate mold, reducing the cost and cycle for mold modifying, improving the versatility of the light guide plate mold and the light guide plate processed by the mold.

The present disclosure has at least the following advantageous effects: compared with conventional light guide assembly with a reflective layer and a diffusion layer separately disposed (i.e., there is no filling between the layers), the light guide assembly of the embodiments of the present disclosure makes light emitted from the light exit surface of the light guide plate more uniform, and the optical effect is improved.

The backlight module and the display device of the present disclosure also include the above described light guide assembly, and therefore can emit light uniformly.

The method for fabricating a light guide assembly of the present disclosure can effectively and quickly fabricate the light guide assembly described above, and the steps are simple. The cumbersome processing and assembly procedure of films in the prior art can thus be avoided, and the production yield and efficiency are greatly improved. It is easy to realize large scale production.

In the description of the present disclosure, it should be understood that the orientation or positional relationship indicated by terms "center", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", "circumferential", etc. is based on the orientation or positional relationship shown in the drawings, and is merely for convenience of describing the present disclosure. The orientation or positional relationship is not used to indicate or suggest the indicated device or element must have a particular orientation, or be constructed and operated in a particular orientation, and therefore should not be construed as limiting the present disclosure.

Furthermore, the terms "first" and "second" are used for descriptive purposes only, and are not to be construed as indicating or implying relative importance or implicitly indicating the number of indicated technical features. Thus, features defined as "first", "second" may explicitly or implicitly include one or more of the features. In the description of the present disclosure, the meaning of "plurality" is two or more than two unless it is specifically defined otherwise.

In this disclosure, the terms "install", "attach", "connect", "fix", etc. should be understood broadly unless specifically stated and defined otherwise. For example, a connection can be a fixed connection, a detachable connection, or an integral connection; it can be a mechanical connection, or an electrical connection as well; the elements can be connected directly, or connected indirectly through an intermediary; a connection can be an internal connection of two elements or an interaction of two elements. Those skilled in the art can understand the specific meanings of the above terms in the present disclosure according to specific circumstances.

In the present disclosure, unless specifically stated and defined otherwise, the first feature "on" or "under" the second feature can be that the first and second features contact directly, or that the first and second features are contact indirectly via an intermediary. Moreover, the first feature "over" or "above" the second feature can be that the first feature directly above or diagonally above the second feature, or merely indicate that the first feature is higher in height than the second feature. The first feature "below" or "under" the second feature can be that the first feature directly below or diagonally below the second feature, or merely indicate that the first feature is lower in height than the second feature.

In the description of the present specification, the description referring to the terms "an embodiment", "some embodiments", "an example", "a specific example", or "some examples" or the like means a specific feature, structures, materials, or characters described in conjunction with the embodiment or example are included in at least one embodiment or example of the present disclosure. In this specification, the schematic expression of the above terms does not necessarily have to refer to the same embodiment or example. Furthermore, the specific features, structures, materials, or characteristics described can be combined in any suitable manner in any one or more of the embodiments or examples. In addition, those skilled in the art can combine the different embodiments or examples described in this specification and features of different embodiments or examples without conflicting with each other.

Although embodiments of the present disclosure have been shown and described above, it will be understood that the above embodiments are exemplary and not to be construed as limiting the present disclosure, and that those skilled in the art can make modifications, substitutions and variations within the scope of the present disclosure.

What is claimed is:

1. A light guide assembly, comprising:
    a light guide plate comprising a light exit surface, a back surface opposite to the light exit surface, and a side surface contacting the light exit surface and the back surface;
    a first reflective layer on the light exit surface and comprising a plurality of light transmissive holes; and
    a diffusion layer on a side of the first reflective layer facing away from the light guide plate, wherein the diffusion layer comprises a plate and a plurality of protrusions on a surface of the plate, and wherein the plurality of protrusions are in one-to-one correspondence with the plurality of the light transmissive holes such that a respective light transmissive hole of the plurality of light transmissive holes receives a corresponding protrusion of the plurality of protrusions.

2. The light guide assembly according to claim 1, further comprising:
    a second reflective layer on at least a part of the side surface and at least a part of the back surface.

3. The light guide assembly according to claim 2, wherein the first reflective layer, the diffusion layer, and the second reflective layer are formed by a coating, printing, spraying, or plating process.

4. The light guide assembly according to claim 1, wherein the plurality of protrusions of the diffusion layer are integral to the plate of the diffusion layer.

5. The light guide assembly according to claim 1 wherein the back surface comprises a plurality of microstructures.

6. The light guide assembly according to claim 1, wherein:
    a part of the side surface defines a light entrance surface; and
    along a direction away from the light entrance surface, a sum of areas of the light transmissive holes per unit area on the first reflective layer gradually decreases.

7. The light guide assembly according to claim 1, wherein:
    respective areas of the plurality of light transmissive holes are equal;
    a part of the side surface defines a light entrance surface; and
    along a direction away from the light entrance surface, a distance between two adjacent light transmissive holes of the plurality of light transmissive holes gradually decreases.

8. The light guide assembly according to claim 1, wherein:
    a distance between two adjacent light transmissive holes of the plurality of light transmissive holes is constant;
    a part of the side surface defines a light entrance surface; and
    along a direction away from the light entrance surface, respective areas of the light transmissive holes gradually increase.

9. The light guide assembly according to claim 1, wherein:
    the light guide plate further comprises a light entrance surface; and
    the light entrance surface comprises a light source receiving groove.

10. A backlight module, comprising:
    a light guide assembly according to claim 1; and
    a light source on a light entrance surface of the light guide plate.

11. The backlight module of according to claim 10, wherein the light source is a light emitting diode (LED) light source, and the LED light source comprises:
- a LED flexible circuit board; and
- a LED light strip on a surface of the LED flexible circuit board,
- wherein the light entrance surface comprises a light source receiving groove, and wherein the LED light strip is in the light source receiving groove.

12. The backlight module according to claim 11, wherein a light emitting surface of the LED light strip is parallel to a surface of the LED flexible circuit board.

13. A display device comprising the backlight module according to claim 10.

14. The display device according to claim 13, wherein the light source is a light emitting diode (LED) light source, and the LED light source comprises:
- a LED flexible circuit board; and
- a LED light strip on a surface of the LED flexible circuit board;
- wherein the light entrance surface comprises a light source receiving groove, and wherein the LED light strip is in the light source receiving groove.

15. A method for fabricating a light guide assembly, the method comprising:
- providing a light guide plate comprising a light exit surface, a back surface opposite the light exit surface, and a side surface contacting the light exit surface and the back surface;
- forming a first reflective layer on the light exit surface, the first reflective layer comprising a plurality of light transmissive holes; and
- forming a diffusion layer on a side of the first reflective layer facing away from the light guide plate, the diffusion layer comprising a plate and a plurality of protrusions on a surface of the plate, the plurality of protrusions being in one-to-one correspondence with the plurality of the light transmissive holes with a respective light transmissive hole of the plurality of light transmissive holes receiving a corresponding protrusion of the plurality of protrusions.

16. The method according to claim 15, wherein the first reflective layer and the diffusion layer are formed by a coating, printing, spraying, or plating process.

17. The method according to claim 15, further comprising:
- forming a second reflective layer on at least a part of the side surface and at least a part of the back surface, the second reflective layer being formed by a coating, printing, spraying, or plating process.

18. The method according to claim 17, further comprising:
- performing a matting treatment on at least a part of the side surface before forming the second reflective layer.

19. The method according to claim 15, further comprising:
- performing a cutting treatment or a surface grinding treatment on the light exit surface before forming the first reflective layer.

20. The method according to claim 15, wherein forming the first reflective layer on the light exit surface comprises:
- forming a mask on the light exit surface, a pattern of the mask corresponding to a pattern of the plurality of light transmissive holes;
- forming the first reflective layer by a coating, printing, spraying, or plating process; and
- removing the mask.

* * * * *